J. W. WRIGHT.
APPARATUS FOR GRADING, SEPARATING, CLEANING, AND CLIPPING GRAIN.
APPLICATION FILED NOV. 22, 1916.
1,279,067.
Patented Sept. 17, 1918.
4 SHEETS—SHEET 1.
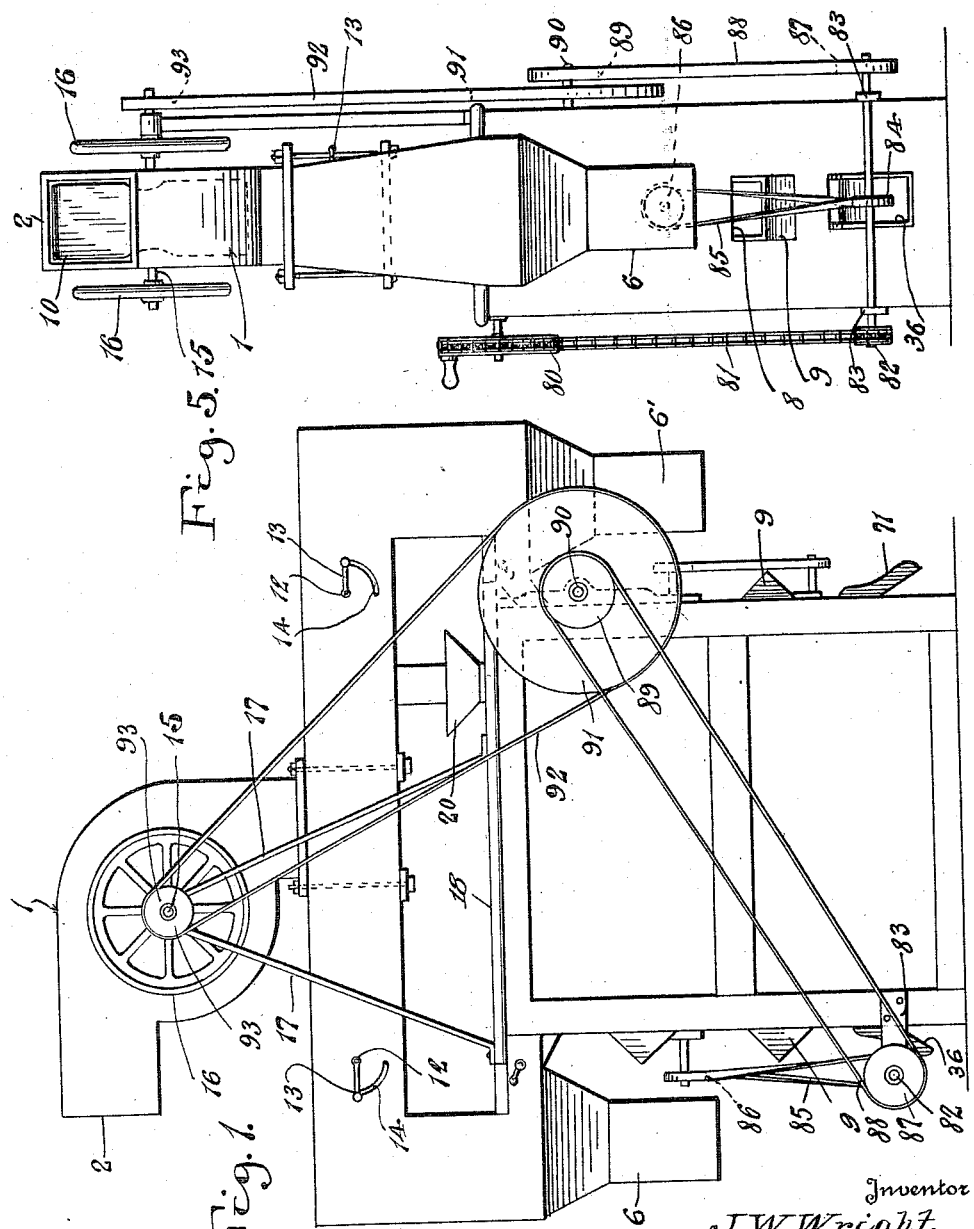
Inventor
J. W. Wright.
Witness:

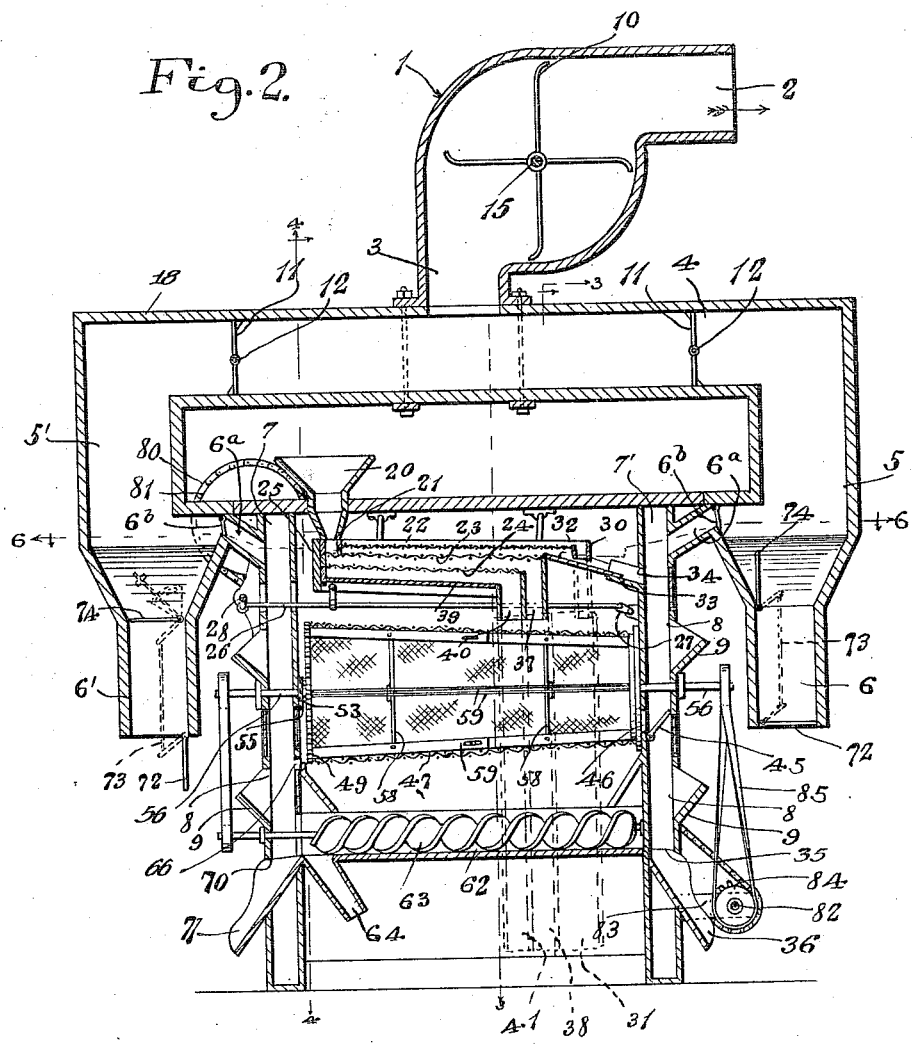

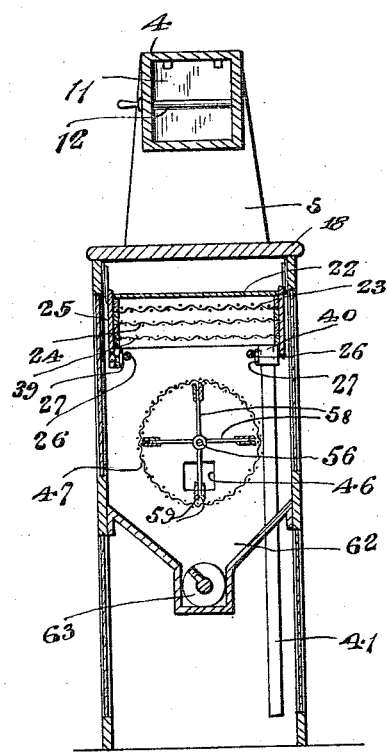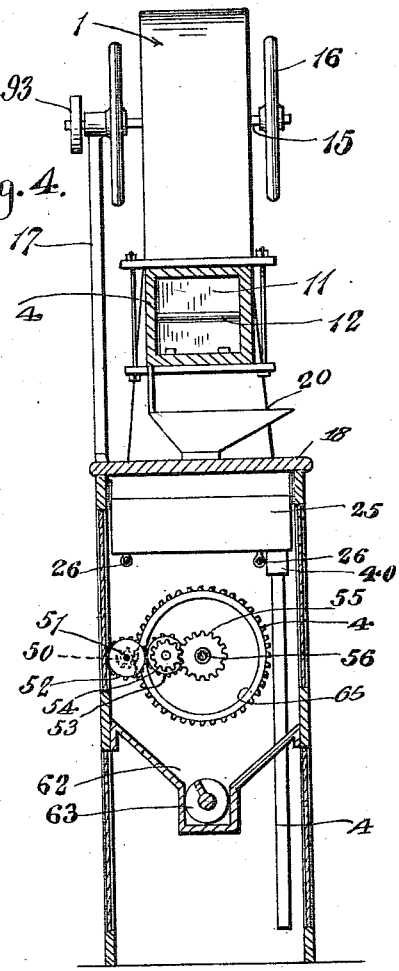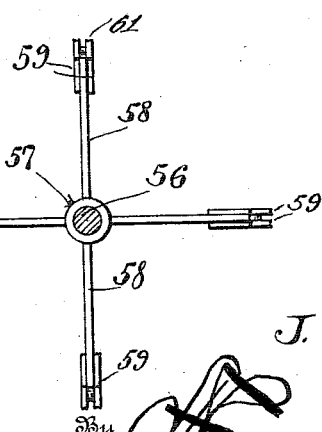

J. W. WRIGHT.
APPARATUS FOR GRADING, SEPARATING, CLEANING, AND CLIPPING GRAIN.
APPLICATION FILED NOV. 22, 1916.
1,279,067.
Patented Sept. 17, 1918.
4 SHEETS—SHEET 4.
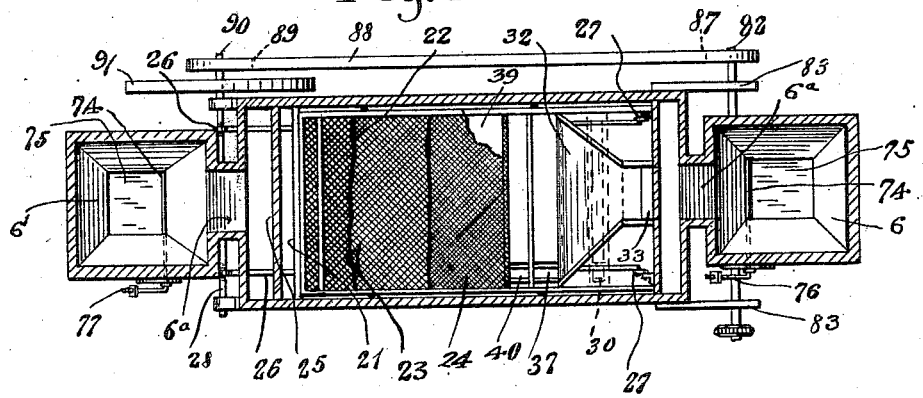
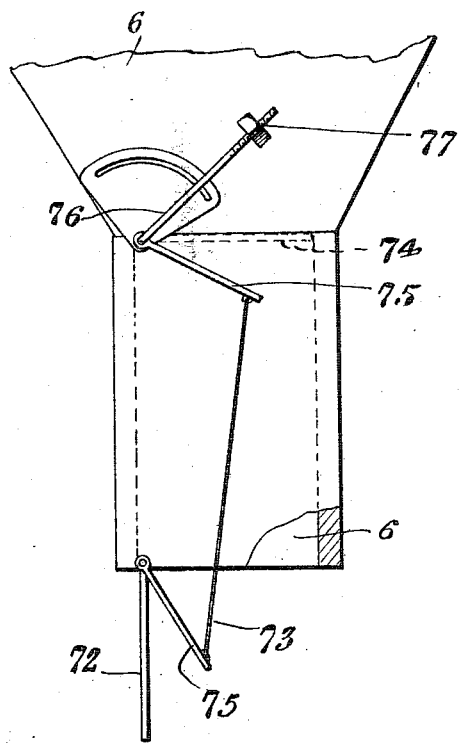
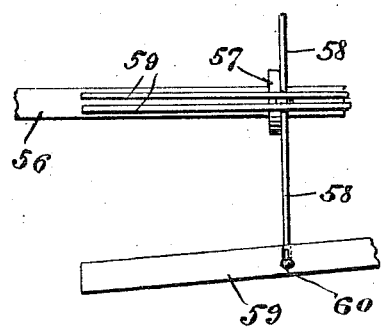
Witness:
J. P. Wahler
Rob't Meyer
Inventor
J. W. Wright.
By
Attorney

UNITED STATES PATENT OFFICE.

JOHN W. WRIGHT, OF BATTLEFORD, SASKATCHEWAN, CANADA, ASSIGNOR OF ONE-HALF TO MURRAY LIVINGSTONE M. SKELTON, OF BATTLEFORD, SASKATCHEWAN, CANADA.

APPARATUS FOR GRADING, SEPARATING, CLEANING, AND CLIPPING GRAIN.

1,279,067.  Specification of Letters Patent.  Patented Sept. 17, 1918.

Application filed November 22, 1916. Serial No. 132,801.

*To all whom it may concern:*

Be it known that I, JOHN W. WRIGHT, citizen of the Dominion of Canada, residing at Battleford, in the Province of Saskatchewan and Dominion of Canada, have invented certain new and useful Improvements in Apparatus for Grading, Separating, Cleaning, and Clipping Grain; and I do hereby declare the following to be a full, clear, and exact description of the invention, such as will enable others skilled in the art to which it appertains to make and use the same.

This invention relates to an apparatus for separating, grading, polishing and cleaning grain, and clipping oats.

The object of the invention is to provide a machine as specified which includes a number of riddles over which the grain passes to an auxiliary vacuum chamber, where the grain is subject to an upward draft caused by a rapidly revolving fan, whereby weeds, weed seeds and residues are lifted into an upper or main chamber with dead ends, the lighter particles being carried out by means of an ordinary rotary fan, while the heavier particles fall into the dead ends of the chamber, from which they may be removed when desired, and the good grain falls into a spout at the bottom of the machine. Before the grain reaches the outlet spout, it can, by means of valve plates, be directed into a revolving wire mesh cage where it is subjected to the action of rotary beaters which revolve reversely to the direction of rotation of the cage or drum, completing the grain cleaning by removing the chaff, husks, and polishing the grain. At the outlet end of the wire mesh drum or cage, which is cylindrical in shape, the grain is again subjected to the effect of the fan by operation of other valve plates, after which the grain falls into an auxiliary chamber, and before reaching the outlet thereto.

If the grain be oats, the beaters acting in conjunction with the wire mesh cage or drum will clip off the tails of the oats allowing the good grain to escape through the outlet end of the drum while the tails, chaff, etc., fall through the drum into a hopper from which it is conveyed by an ordinary worm conveyer.

Another object of this invention is to provide an automatically acting means for emptying the weeds, weed seeds and other residue from either of the dead ends of the vacuum chamber, which means includes a pair of pivoted doors, which are connected by means of a rod and have a counterbalancing weight connected thereto, so that when the weight of the weeds, weed seeds and other residue which is supported by one of the pivoted doors is greater than the weight of the counterbalancing weight, this door will be forced open for permitting of the emptying of the contents of the dead end of the chamber, while the upper door will be moved into a closed position for preventing an air suction through the outlet of the end. The doors will be swung into their normal positions, by the air suction created therein through the operation of the fan.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of the apparatus employed for grading, separating, cleaning and clipping grain.

Fig. 2 is a longitudinal vertical section through the machine.

Fig. 3 is a vertical cross section through the machine taken on the line 3—3 of Fig. 2.

Fig. 4 is a vertical cross section through the machine taken on the line 4—4 of Fig. 2.

Fig. 5 is an end view of the machine.

Fig. 6 is a horizontal section on the line 6—6 of Fig. 2 having parts thereof broken away.

Fig. 7 is a detail view of the rotary beater.

Fig. 8 is an enlarged side elevation of the chaff retaining and automatic dumping structure, and Fig. 9 is a fragmentary side elevation of the rotary beater or polisher.

Referring more particularly to the drawings, 1 designates the fan casing, the outlet 2 of which communicates with the atmosphere, while the inlet 3 of the fan communicates with the interior of a chamber 4. The chamber 4 has downturned ends 5 and 5' formed thereon, the extreme lower ends 6 and 6' of which are reduced, the purpose of which will be hereinafter more fully described. The downturned end 5 and 5' of the chamber 4 has communication through pipes 6ᵃ with auxiliary air chambers 7. The chambers 7 have air intake openings 8 formed therein, about which openings are mounted air guiding cowls 9 which guide the air downwardly into the auxiliary chambers 7 and 7'. The air suction created by the rotary fan 10, which is mounted within the fan casing 1 will pass inwardly through the opening 8, upwardly through the auxiliary chambers 7 and 7', pipes 6ᵃ and into and through the end 5 and 5' and the chamber 4, passing out of the fan through the outlet 2. Suitable butterfly valves 11 are mounted in the chamber 4 and are provided for regulating the air suction therethrough and for cutting off the air suction from either of the chambers 7 and 7' if desired. The butterfly valves 11 are carried by rods 12, which have handles 13 mounted on their outer ends. The handles 13 are held in adjusted positions, by means of any ordinary structure for this purpose, such as indicated at 14.

The fan 10 is mounted upon a shaft 15, which has suitable fly or balance wheels 16 mounted thereon. The shaft 15 is supported by a suitable support 17 which extends upwardly from the top 18 of the frame of the machine.

The grain to be cleaned, is deposited into a hopper 20, which guides the grain downwardly into a distributing trough 21, which distributes the grain over the upper surface of the uppermost riddle 22 of a series of riddles.

In the drawings, riddles 22, 23 and 24 are shown, but any number of riddles may be employed without departing from the spirit of this invention, and as may be necessary for the proper sorting and cleaning of various types of grain.

The uppermost riddle 22 is made of coarse mesh work, while the riddle 23 positioned directly beneath the riddle 22 is of slightly finer mesh work, and the lowermost riddle 24 is of still finer mesh work, so that the various types of grain will be sorted or separated, and graded during their passage over the riddle.

The riddles 22, 23 and 24 are carried by the usual type of frame work 25 which is connected to a rod 26, which rod is rocked or reciprocated by eccentrics 27 and attached to the arm 28, for oscillating or reciprocating the riddles in short quick strokes for insuring their efficient operation.

The grain will fall through the mesh of the riddle 22, upon the riddle 23 while the straw, large particles of chaff and other foreign material will travel over the full length of the riddle 22, which inclines, and be deposited into a trough 30 which will deliver the straw to a second trough 31 which will in turn deliver the straw and analogous material below the machine as clearly shown in Fig. 2 of the drawings.

The perfect and fine grade of grain or kernels will travel over the upper surface of the riddle 23, over a guiding board 32 and into a guiding trough 33 which has communication through an opening 34 with the auxiliary air chamber 7'. When the grain reaches the air chamber 7', it is met by a draft of air upwardly through the auxiliary chamber, from the air intake 8 and the force of the air suction will keep the grain momentarily suspended by virtue of the operation of the fan. While the grain is thus suspended and "dancing," up and down, the lighter particles are carried upwardly into the downturned end 5 of the chamber 4, where they are released from the effect of the fan, owing to the fact that the downturned ends 5 have a greater cubic area than the cubic area of the auxiliary air chambers 7 and 7', thereby depreciating the effect of the fan and allowing the chaff, etc., to fall into the dead end 6 while the good grain will fall downwardly through the auxiliary chamber 7' and outwardly through the opening 35, into the delivery spout 36 which may deliver the grain into sacks, or any desirable retaining receptacle.

The second grade or smaller grains will fall through the riddle 23 upon the riddle 24, and will travel along the upper surface of this riddle, and be deposited in a trough 37 which will in turn deliver them to a downwardly extending trough 38. The dust, weed seeds and analogous fine material will fall through the riddle 24, upon a plate 39, which will in turn deliver it to a trough 40 which extends across the delivery end of the plate. The spout 40 will deliver the dust, weed seeds and the like to a downwardly extending chute 41 which extends downwardly along one side of the chute or spout 38, as clearly shown in Fig. 2 of the drawings.

When it is desired to further clean and polish the grain, a flap valve 45 is operated for preventing good grain from passing completely through the auxiliary air chamber 7' and for guiding it through an opening 46 into a rotary foraminous drum or cage 47 which is substantially frusto-conical in shape and is constructed of wire mesh. The foraminous drum 47 has a crown gear 49 mounted about the outer surface of the enlarged delivery end of the same, which crown gear meshes with a pinion 50 which is mounted upon a stub shaft 51. A gear 52 is mounted upon the shaft 51 and it meshes with a gear 53 carried by a stub shaft 54. The stub shaft 54 is connected through the medium of a gear connection 55 with a shaft 56 upon which is mounted a rotary beater structure 57.

The rotary beater is positioned interiorly of the rotary drum 47, and it comprises a pair of spider members 57 which include a plurality of radiating arms 58. Each of the arms 58 has a pair of beater or clipper blades 59 attached to its outer end, which blades extend longitudinally of the drum 47, for practically the entire length of the drum as clearly shown in Fig. 2 of the drawings. The blades 59 are provided with slots 60, through the medium of which slots and ordinary bolts the blades are adjustably connected to the arms of the spiders 57 for increasing or decreasing the radius of the beater. The blades 59 have their longitudinal edges concavely cut as indicated at 61, the purpose of which will hereinafter appear.

The grain, which is delivered from the riddle 23, to the auxiliary air chamber 7', is guided by the pivoted plate 45, through the opening 46, into the interior of the foraminous drum 47 where it will be thoroughly cleaned and polished, by the rotation of the drum and beater structure which will also polish the grain. The chaff and fine particles of foreign matter which is shaken and polished from the grain, will fall through the opening in the foraminous drum 47, into a trough like receptacle 62, which is positioned beneath the drum. The trough like receptacle 62 has an ordinary worm or screw conveyer 63 mounted in the bottom of the same, which will carry the chaff or foreign matter longitudinally through the receptacle 62 and deliver it to a delivery spout 64. The grain, will pass through the drum 47, and out through an outlet opening 65, through an opening 66 and into the auxiliary air chamber 7. When the grain enters the auxiliary air chamber 7 from the opening 66, it will be subjected to the air suction upwardly through this auxiliary air chamber, and the chaff which has passed through the drum, will, owing to the fact that it is lighter than the grain be drawn upwardly into the end 5' of the chamber 4, where it will be relieved of the air suction, as previously described and fall downwardly into the dead end 6'. The cleaned grain will fall downwardly through the auxiliary air chamber 7, through an opening 70 into a delivery spout 71. The ends 6 and 6' are provided with automatic dumping mechanisms, which comprise bottom doors 72, which are hingedly connected to the bottoms of the ends 6 and 6'. The rods 73 are connected to arms 75, which arms are in turn connected to the doors 72 and 74 respectively. An arm or rod 76 is connected to each of the upper doors 74 and it has a balance weight 77 mounted thereon.

The chaff, weed seeds and foreign material accumulating in the end 6 will eventually overcome the weight 77, and force the door 72 outwardly, permitting the chaff, and other foreign material to fall out of the end 6. When the door 72 is forced downwardly for opening the outlet end of the chamber 6', the door 74, which is positioned at right angles to the door 72 will move into a horizontal position closing the inlet of the end 6'. After the chaff and other foreign material which is positioned in the end 6' has fallen therefrom, the air suction through the ends 6ª, in combination with the weight 77 will act to move the door 72 into its normal closing position and the door 74 in a vertical position as indicated in solid lines in chamber 6 in Fig. 2 of the drawings.

The machine may be operated in any suitable manner, such as by manual power or any suitable type of mechanical power. In the drawings, a hand wheel 80 is illustrated, which has connection through the medium of a sprocket chain 81 to a shaft 82. The shaft 82 is supported by suitable bearings 83 and it has a pulley 84 mounted thereon intermediate its ends, about which a twisted belt 85 travels. The belt 85 also travels about a pulley 86 which is mounted upon the shaft 56. The rotation of the shaft 56 will rotate the beater structure, and also the foraminous drum structure, which drum structure will be rotated in a direction opposite to the rotation of the beater, owing to its operative connection with the shaft 56 as previously described.

The shaft 82 has a second pulley 87 mounted thereon about which a belt 88 passes. The belt 88 also travels about a pulley 89 mounted upon the shaft 90, which shaft operates the eccentric 27 and 28 and the rods 26. A pulley 91 is also mounted upon the shaft 90 about which pulley a belt 92 travels. The belt 92 passes about a pulley 93 which is mounted upon the fan shaft 15, thereby rotating the fan 10 by the rotation of the shaft 90. The proper speeds of the various parts may be regulated by the size of the various pulleys.

Summing up, the operation of the improved machine is generically as follows: The grain, such as wheat or the like is fed to the hopper 20, which is set a short distance above the distributing box 21, for filling up the distributing box without overflow. The rapid vibration and oscillating movement of the riddles 22, 23 and 24 caused by the eccentrics 27 and 28 spreads the grain evenly over the surface of the riddles, dropping the smaller grains, seeds or the like to the respective riddles. The riddle 22 takes care of straw, and other large foreign matter, while the second riddle 23 delivers the high grade grain to the conveying board 32, which in turn delivers it to the trough 30.

and the auxiliary air chamber 7'. The third riddle of the riddle 24 carries the second grade of grain, and the last riddle or the plate 39 receives the dust, weed seeds and other very fine particles of foreign material. Any number of riddles may be used, as desired and as the proper cleaning of various types of grain may dictate. The good grain, when it arrives in the auxiliary air chamber 7', is met with a draft of air or air suction passing upwardly through the chamber from the air inlet 8 and the force of the air suction keeps the grain momentarily suspended by virtue of the operation of the fan 10. While the grain is thus suspended and "dancing," up and down the lighter particles are carried upward into the main vacuum or air chamber 5 where they are released from the effect of the fan, as previously explained, and allowed to drop into the dead end 6, from which they are delivered by the operation of the automatic dumping means heretofore described. Very light chaff may be carried upwardly through the fan. The proper draft or air suction for removing the by-products, can be obtained by the manipulation of the valves 11, and suitable valves 6ᴮ, which are mounted in the pipes 6ᵃ. The good grain, falls downwardly, into the outlet spout 36, unless it is desired that the grain be subjected to the action of the beater for removing husk and to polish it. The grain is then turned into the rotary foraminous drum 47 by means of the pivoted valve or plate 45, where the cylindrical shape of the drum and the action of the beater drives the grain into the auxiliary air chamber 7 at the opposite side of the machine from the air chamber 7' where the grain is again subjected to the air suction and cleaned. Dust, small particles of chaff and other material drops through the mesh of the drum 47 and the worm conveyer 63 then takes it away from the hopper or receptacle 62.

The same process or operation is gone through when oats are to be cleaned and graded, but when the oats arrive at the drum 47, they have their ends or tails clipped off, by the blades 59, which have their outer edges concavely cut for this purpose. The wire mesh is of such size that only the small ends of the oats are caught and held for clipping by the knives or beaters. The blades 59 are set so that they will clip only the tails or ends of the oats as they rotate, while oats being smaller than the grade of oats allowed to pass into the drum, will be crushed between the knives of blades 59 and the inner surface of the drum 47, or will fall through the mesh of the drum.

From the foregoing description taken in connection with the accompanying drawings, the advantages of construction and of the method of operation of the improved process and apparatus for grading, separating, cleaning and clipping grain will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a device as set forth, a supporting structure having first and second vertical air chambers upon its ends, a third air chamber of greater cubic area than said first named air chambers extending across said supporting frame above the vertical air chambers, pipes communicating with said third air chamber and with the upper ends of the vertical air chambers, grain sorting means arranged to deliver grain to said first vertical air chamber, grain cleaning means arranged to deliver grain to said second vertical air chamber, means for directing grain from said first vertical air chamber to said grain cleaning means, an air suction fan communicating with said third air chamber whereby the grain delivered to said vertical air chambers will be subjected to an upward air blast, conveyer means positioned beneath said grain cleaning means for receiving material which passes through said cleaning means, a delivery trough for said conveying bin, said conveying means opening into said second vertical air chamber near said delivering trough whereby the material conveyed by the conveying means will be subjected to an air blast during deposit in said delivery trough.

2. In a device as set forth, a supporting structure having first and second vertical air chambers upon its ends, a third air chamber of greater cubic area than said first named air chamber positioned above said vertical chambers, pipes communicating with said third air chamber and with the upper ends of said vertical air chambers, grain sorting means arranged to deliver good grain to said first vertical air chamber, grain cleaning means arranged to deliver grain to said second vertical air chamber, means for directing grain from said first vertical air chamber into said grain cleaning means, an air suction fan communicating with said third air chamber whereby the grain delivered to said vertical air chambers will be subjected to an upward air blast, valves positioned within said third air chamber whereby the air suction may be cut off from either of said vertical chambers, conveyer means positioned beneath said grain cleaning means for receiving material which passes through said cleaning means, a delivery trough for said conveying means, said conveying means opening into said second vertical air chamber near said delivery trough whereby the material conveyed by the conveying means will be subjected to an air blast during deposit in said delivery trough.

3. In a device as set forth, a supporting structure having first and second vertical air chambers upon its ends, a third air chamber of greater cubic area than said first named air chamber positioned above said vertical chambers, pipes communicating with said third air chamber and with the upper ends of said vertical air chambers, grain sorting means arranged to deliver good grain to said first vertical air chamber, grain cleaning means arranged to deliver grain to said second vertical air chamber, means for directing grain from said first vertical air chamber into said grain cleaning means, an air suction fan, communicating with said third air chamber whereby the grain delivered to said vertical air chambers will be subjected to an upward air blast, valves positioned within said third air chamber whereby the air suction may be cut off from either of said vertical chambers, conveyer means positioned beneath said grain cleaning bins for receiving material which passes through said cleaning means, a delivery trough for said conveying means, said conveying means opening into said second vertical air chambers near said delivery trough whereby the material conveyed by the conveying means will be subjected to an air blast during deposit in said delivery trough, and valves positioned within said pipes for regulating the air suction through said vertical chambers.

4. In a device as set forth, a supporting structure having first and second vertical air chambers upon its ends, a third air chamber of greater cubic area than said first named air chamber positioned above said vertical chambers, pipes communicating with said third air chamber and with the upper ends of said vertical air chambers, a rotary foraminous drum, means for rotating said drum, a rotary beater positioned within said drum, means for directing grain from said third vertical air chamber into said drum, said drum delivering grain into said second vertical air chamber, an air suction fan communicating with said third air chamber, whereby the grain delivered to said vertical air chambers will be subjected to an upward air blast, valves positioned within said third air chamber whereby the air suction may be cut off from either of said vertical chambers, conveyer means positioned beneath said rotary foraminous drum for removing material which passes through the drum, a delivery trough for said conveying means, said conveying means opening into said second vertical air chambers near said delivery trough whereby the material conveyed by the conveying means will be subjected to an air blast during deposit in the trough.

In testimony whereof I affix my signature in presence of two witnesses.

JOHN W. WRIGHT.

Witnesses:
SIDNEY A. LAW,
F. G. ATKINSON.

Copies of this patent may be obtained for five cents each, by addressing the "Commissioner of Patents, Washington, D. C."